(12) United States Patent
McVickar et al.

(10) Patent No.: US 8,970,559 B1
(45) Date of Patent: Mar. 3, 2015

(54) FINGERNAIL STYLUS

(76) Inventors: Henry Lansing McVickar, Piermont, NY (US); John James McGlew, Briarcliff Manor, NY (US)

( * ) Notice: Subject to any disclaimer, the term of this patent is extended or adjusted under 35 U.S.C. 154(b) by 435 days.

(21) Appl. No.: 13/043,139

(22) Filed: Mar. 8, 2011

(51) Int. Cl.
*G06F 3/033* (2013.01)

(52) U.S. Cl.
USPC .......................................... 345/179; 345/156

(58) Field of Classification Search
CPC .. G06F 3/033; G06F 3/039; G06F 2203/0331
USPC .................................. 345/173, 179
See application file for complete search history.

(56) References Cited

U.S. PATENT DOCUMENTS

| | | | | |
|---|---|---|---|---|
| 3,962,679 A * | 6/1976 | Engelbrecht | ................... | 382/122 |
| 6,225,988 B1 * | 5/2001 | Robb | ............................ | 345/179 |
| 2003/0018295 A1 * | 1/2003 | Henley et al. | ................... | 604/20 |
| 2005/0093835 A1 * | 5/2005 | Mortarelli | ..................... | 345/179 |
| 2005/0231471 A1 * | 10/2005 | Mallard et al. | ................ | 345/156 |
| 2008/0117189 A1 * | 5/2008 | Flachsbart | ..................... | 345/179 |
| 2008/0297493 A1 * | 12/2008 | Adkins | ........................ | 345/179 |
| 2009/0278818 A1 * | 11/2009 | DiNozzi et al. | ............... | 345/179 |
| 2009/0289893 A1 * | 11/2009 | Drangel et al. | ............... | 345/156 |

* cited by examiner

*Primary Examiner* — Jonathan Horner
(74) *Attorney, Agent, or Firm* — McGlew and Tuttle, P.C.

(57) ABSTRACT

A stylus is provided with a finger engaging structure including a conductive portion for electrically contacting a finger of a user and a grasping portion for grasping the finger. The stylus has an electrically conductive stylus pad and a fingernail support element connected to the stylus pad and with a portion in contact with the fingernail of the user for positioning the stylus pad relative to the fingernail. A connection is provided from the fingernail engaging structure to the fingernail support element for electrical charge connection between the conductive portion and the stylus pad and for connecting the fingernail support to the finger engaging structure.

11 Claims, 16 Drawing Sheets

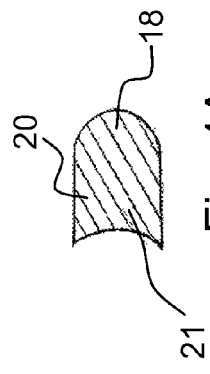
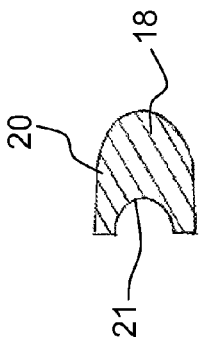
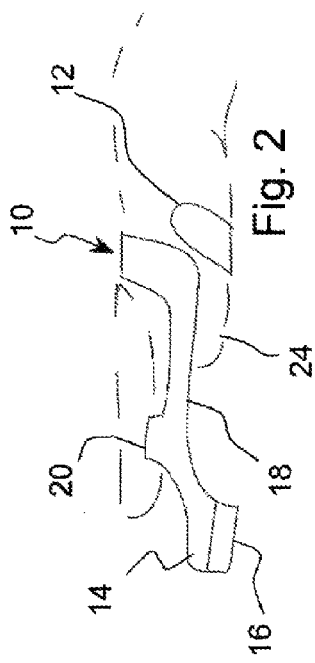
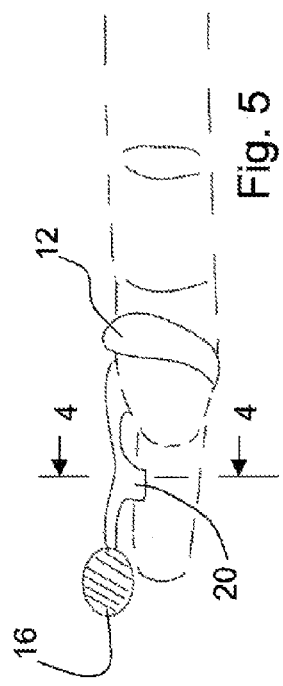
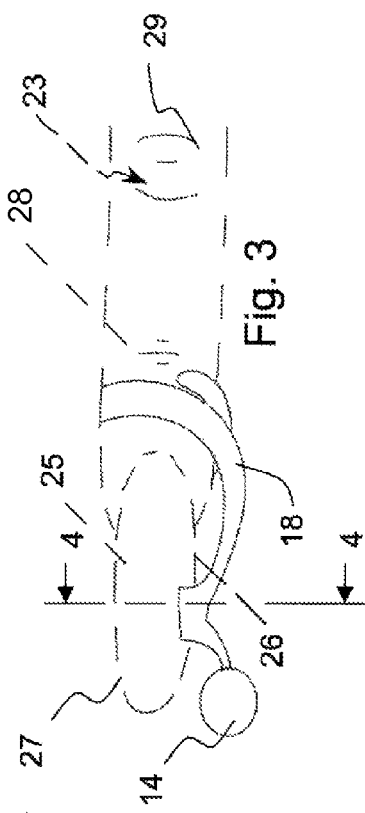

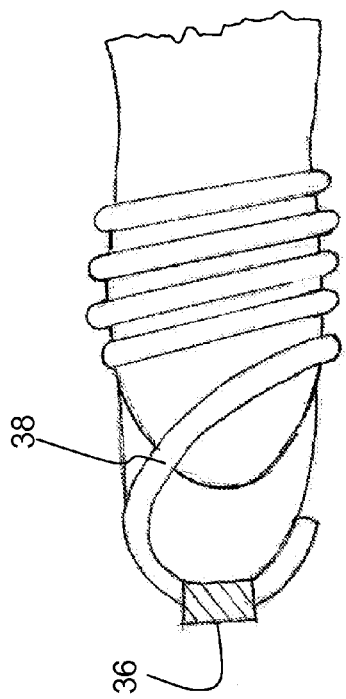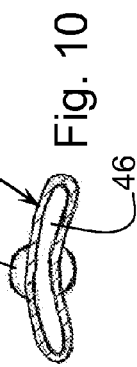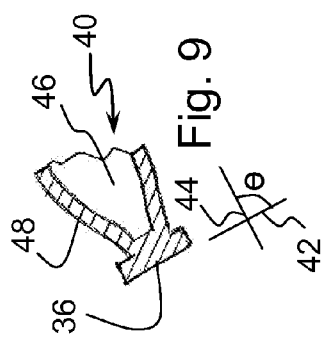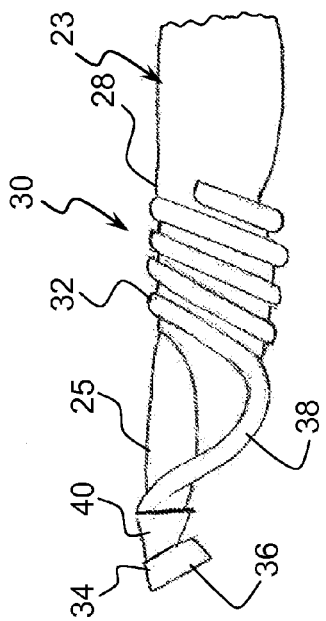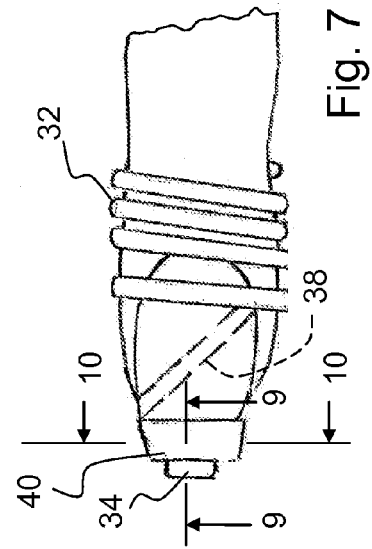

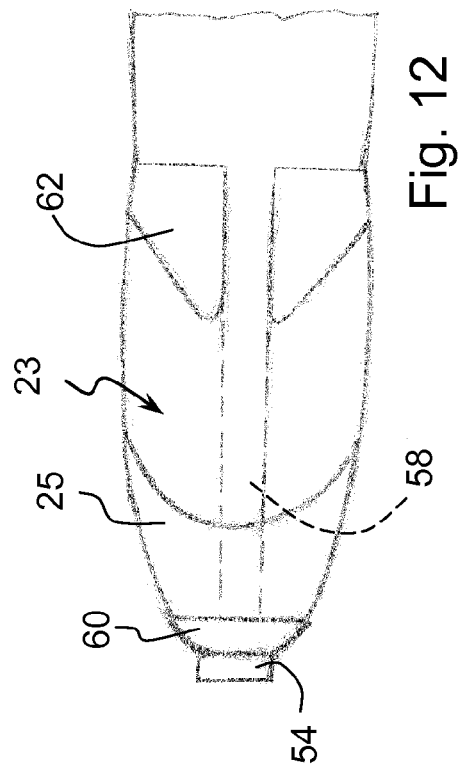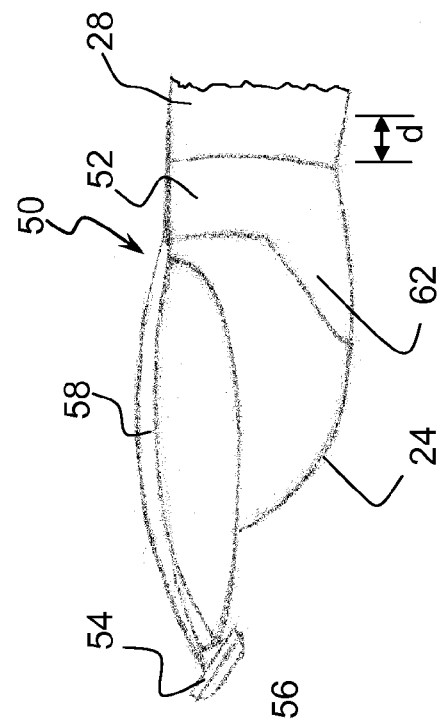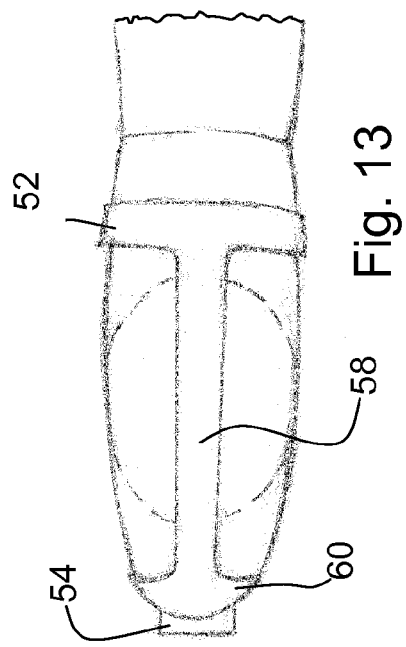

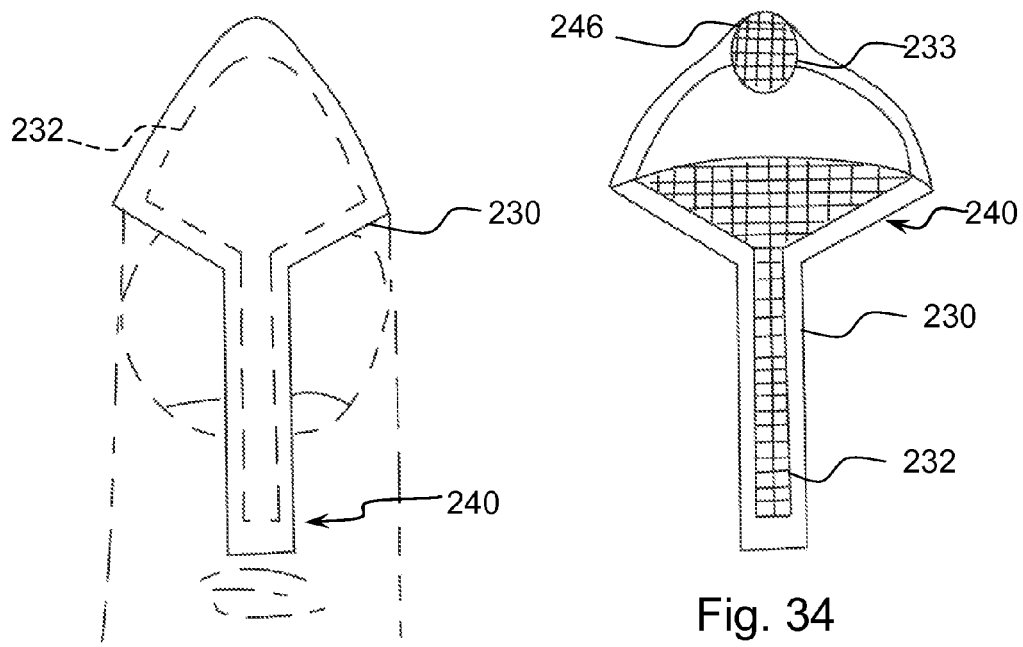
Fig. 33
Fig. 34
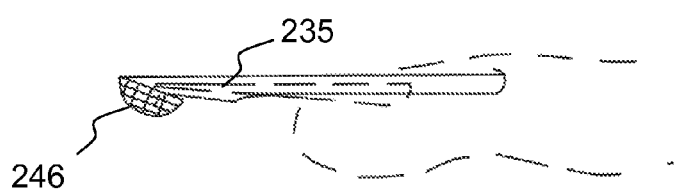
Fig. 32
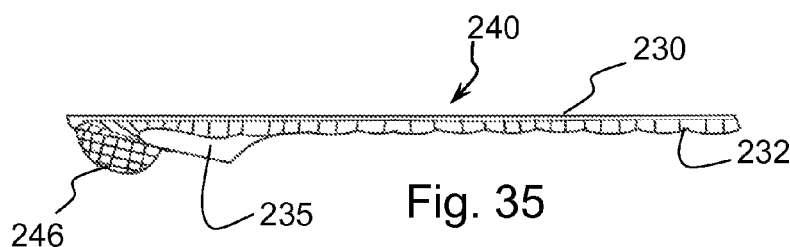
Fig. 35

FINGERNAIL STYLUS

FIELD OF THE INVENTION

The invention relates to a stylus, particularly for use with a touch screen sensitive to the charge source of the finger of the user such as the touch screen that detects touch through methods such as mutual capacitance or self capacitance.

BACKGROUND OF THE INVENTION

Touch screens are used which are sensitive to the finger of a human. Touch screens such as on the Apple iPhone are based on either mutual capacitance or self capacitance. In mutual capacitance, the capacitive circuitry requires two distinct layers of material. One houses driving lines, which carry current, and the other houses sensing lines, which detect the current at nodes. Self capacitance uses one layer of individual electrodes connected with capacitance-sensing circuitry. Both of these systems send touch data as electrical impulses. These technologies use the charge source (mass) of the human body through the finger to provide the charge at the touchscreen surface to activate the touchscreen features.

Styluses are known which connect to the hand or are grasped by the finger of the user and present the electrical charge mass of the user (conduct the charge/charge mass of the user) to a stylus pad. The stylus is grasped, is conductive, and allows activation of the touchscreen features.

Styluses are also known that attach to a finger. These have various drawbacks including not functioning with touchscreens responsive to the electoral potential of the human. Further, these styluses, which attach to the fingers of the user, typically do not allow for lengthy fingernails and also provide the stylus location below the finger such that the location of action on the touchscreen is obscured by the user's own finger or fingernail.

SUMMARY OF THE INVENTION

It is an object of the invention to provide a stylus which is supported and connected to a finger (such as an index finger or thumb) and which supports or positions a stylus contact pad at or near an edge or tip of the fingernail of the finger, allowing activation of a touchscreen via a stylus pad at the fingernail tip or edge.

It is further object of the invention to provide such a stylus which connects to the finger and conducts the electrical charge from the finger of the user to the electrical contact stylus pad surface at the fingernail tip or edge of the user.

In this application, the term fingers is meant to include all of the various fingers including the thumb. The invention is particularly directed to a stylus structure which can be connected to the index finger of the user or to a stylus structure which can be connected to the thumb of the user. The position of the stylus pad at or near the fingernail edge advantageously may position the stylus pad so that it is visible by the user, to some extent, beyond the nail tip, allowing viewing of the stylus pad contact location. In the alternative, the stylus pad is disposed just out of view of the user, but at or near the edge or tip of the fingernail so as to provide the user with the feel of tapping or pressing via the edge or tip of the fingernail, when the stylus pad contacts a location on a touch screen. In particular, in the later case, the fingernail tip or edge is the visual feature the user associates with the stylus pad contact location.

The conductive material advantageously may be metal, conductive fibers, conductive foam, conductive fluid and even conductive plastic. Combinations of materials may be used for a conductive path from finger to stylus and structural support, that need not be conductive. A porous or fibrous structure that take up a liquid, particularly a wicking structure (that spreads water or other conductive fluid by capillary action) may be a wick electrical charge system comprising the stylus pad surface defining structure, the electrical charge conductive path and the finger electrical contact structure. This may be mostly covered by other structure (or be covered by engagement with the finger) so as to not dry out quickly. The system may be replenished with conductive fluid e.g., by further contact of the stylus pad with water—that wicks through the structure that takes up a liquid. The system may instead be material forming a carrier for a conductive gel material.

According to the invention, a finger stylus is provided with an electrical stylus contact pad, particularly a contact pad having an electrical conducting surface of a sufficient surface area for actuating an iPhone type touch screen. The stylus pad surface may be for example about 2 mm×2 mm and smaller, but must provide a sufficient planar contact area for the charge to be detected by the touch screen. The texture of the pad surface may provide a flexing of the stylus contact surface. The surface texture may provide a smother contact to not scratch the touch screen surface. A flexible and resilient surface allows contact directions that are slightly at an angle. For most embodiments of the invention a soft conductive material can be provided to form the stylus pad surface. This may be for example conductive foam such as cross linked closed cell conductive foam from Statico. This is high quality electrically conductive PU foam designed for use in protecting ESDS (Electro Static Discharge Sensitive) components and devices in the process of assembly, transportation and packaging. Conductive foams such as LD50CN High Density Closed Cell Cross-linked Conductive Polyethylene, EV45CN (EVA Copolymer Conductive) available from Zotefoams Inc. may be used. Other soft conductive materials may be used. Further, the stylus pad surface may be provided by soft material which is wetted, and thereby conductive. This wetted (with water or other conductive liquid or conductive gel) soft material may be connected to a conductive line or be part of a wick conductive system as noted above.

The invention comprises support structure to position the stylus contact pad at a location at or adjacent to the tip/edge of the fingernail of the user. Electrical contact structure is provided for engaging the finger of the user. The electrical contact structure includes electrically conductive material contacting the skin of the finger to be at the electrical charge of the human user (to be in electrical contact with the finger) and for connecting to the electrical stylus contact pad in an electrically conductive manner.

According to the invention, the contact structure includes a structure for engaging the finger of the user, preferably in the region of the fingernail adjacent to the first joint, and being held at a supported location, in a supported manner, by contact with the finger. Further, according to the invention the structure for connecting the supported location to the fingernail engaging part supporting the contact pad holds the fingernail engaging portion under pretension based on the engagement at the supported location.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a side view of a first embodiment of a fingernail stylus according to the invention;

FIG. 3 is a top view of the first embodiment according to the invention;

FIG. 4A is a cross-sectional view according to the first embodiment, taken along line 4-4 of FIG. 3;

FIG. 4B is a cross-sectional view according to a variation of the first embodiment, taken along line 4-4 of FIG. 3;

FIG. 4C is a cross-sectional view according to another variation of the first embodiment, taken along line 4-4 of FIG. 3;

FIG. 5 is a bottom view of a fingernail stylus according to a first embodiment of the invention;

FIG. 6 is a side view of a second embodiment of a fingernail stylus according to the invention;

FIG. 7 is a top view of the second embodiment of a fingernail stylus according to the invention;

FIG. 8 is a bottom view of the second embodiment of a fingernail stylus according to the invention;

FIG. 9 is a cross-sectional view taken along line 9-9 of FIG. 7 and showing a reference for the direction of the stylus pad contact surface relative to the general direction of the fingernail;

FIG. 10 is a cross-sectional view taken along line 10-10 of FIG. 7;

FIG. 11 is a side view of a third embodiment of a fingernail stylus according to the invention;

FIG. 12 is a bottom view of the third embodiment of a fingernail stylus according to the invention;

FIG. 13 is a top view of the third embodiment of a fingernail stylus according to the invention;

FIG. 32 is a side view of a twelfth embodiment of a fingernail stylus according to the invention;

FIG. 33 is a top view of the fingernail stylus of FIG. 32;

FIG. 34 is a bottom view of the fingernail stylus of FIG. 32;

FIG. 35 is a cross-sectional view of the fingernail stylus of FIG. 32;

DESCRIPTION OF THE PREFERRED EMBODIMENTS

Figure 1:
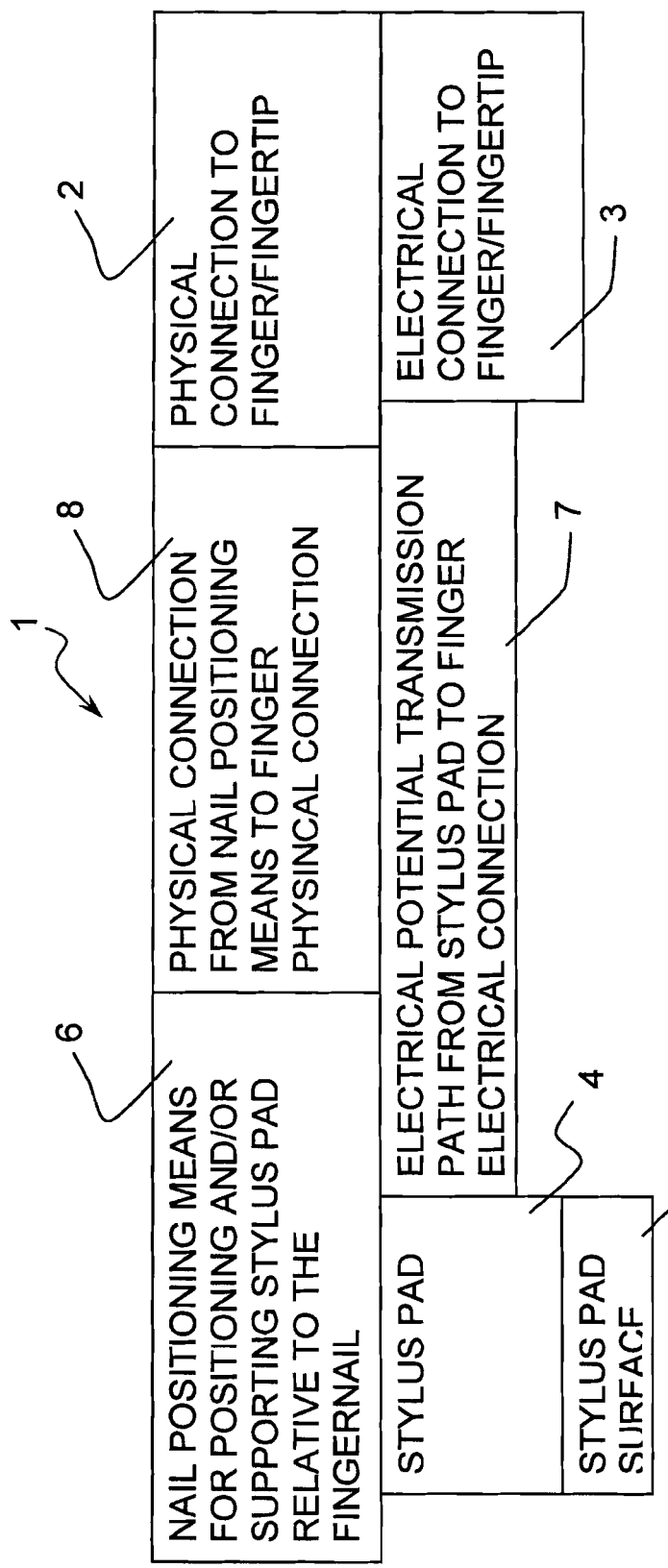
FIG. 1 is a schematic view showing features common to various embodiments of the invention.

Referring to the drawings in particular, FIG. 1 shows a fingernail stylus generally designated 1. The stylus 1 includes a physical connection 2 to the finger/fingertip of a user. The stylus 1 includes an electrical connection 3 to the finger/fingertip electrical charge and an electrical stylus pad 4 with a stylus pad surface 5. A nail positioning means 6 is provided for positioning and/or supporting the stylus pad relative to the fingernail of the user. The positioning is particularly relative to the edge/side or tip of the fingernail. The support provides support against relative movement between the position of the stylus pad and the fingernail (support against a change in the positioning). A bridging physical connection 8 is provided from the nail positioning means 6 to the finger physical connection 2. An electrical charge transmission path 7 is provided from the stylus pad 4, in particular from the stylus pad surface 5, to the finger/fingertip electrical connection 3.

FIG. 2 shows a side view of a fingernail stylus generally designated 10. The stylus 10 is formed of conductive material such as a conductive metal or a mix of conductive and non conductive materials. The stylus 10 includes a finger engaging portion 12 which extends around the finger 23 of the user. The finger engaging portion 12 may be a ring or a C-shaped part. The finger engaging portion 12 is shown in the first embodiment as a partial spiral wrap. The structure is advantageous in allowing some tightening where the finger engaging portion 12 contacts the finger 23. A stylus pad 14 is provided with a surface 16. A metal connecting portion 18 extends from the finger engaging portion 12 to the stylus pad 14. The fingernail stylus 10 includes a fingernail engaging portion 20 for engaging a side 26 of the fingernail 25 or alternatively for engaging the upper edge 27 of the fingernail 25.

The stylus 10 may advantageously be a single integral metal part. The shape of the connecting portion 18 (length/thickness) as well as the attributes of the metal used may advantageously provide a spring force causing the fingernail engaging portion 20 to bear against the edge 26 or tip 27. The stylus 10 may also be formed of non conductive material with a conductive features for the corresponding finger/fingertip electrical connection, the electrical charge transmission path and the structure forming a contact pad surface 16.

FIG. 5 shows the preferable positioning of the stylus pad surface 16 relative to the fingernail. However, the angle of the stylus pad relative to the fingernail may be other than what is shown in FIG. 2. This is discussed further below. However, with regard to the top and bottom reference, relative to the fingernail, the stylus is preferably just outwardly of the edge of the fingernail (side 26 or tip edge 27) so the point of contact of the stylus pad with the touchscreen can be easily viewed. As an alternative, the stylus pad may be partially, but preferably not entirely, below the fingernail 25, wherein the partial view of the stylus pad allows easy recognition of the position, or presents the feel of the tip 27 or edge 26 of the fingernail itself.

FIGS. 4A, 4B and 4C show a cross-sectional view take the long line 4-four of FIGS. 3 and 5. FIG. 4A shows the metallic cross-section of the fingernail engaging portion 20 as well as the curved interior surface 21. FIG. 4B shows a modified embodiment with a surface 21 have a more defined curve to more fully seat the edge 26 or tip 27 of the fingernail 25. According to the embodiment of FIG. 4C a defined curve surface 21 is provided but is formed of a rubber insert 22. Insert 22 may advantageously also be a soft plastic or other material to provide a more cushioned contact between the fingernail 25 and the fingernail stylus 10.

The stylus 10 as shown in FIGS. 2 and 3 is particularly useful wherein the finger of the user is the user's thumb and the touching of the touch pad is at the side edge or side of the tip of the thumb nail. The finger engaging portion 25 can be seated just above the thumb joint, namely the first finger joint 28 below the lower edge of the fingernail 25. The shape of the finger engaging portion 12 allows for some tightening and allows for good electrical contact. Further the entire structure has the appearance of jewelry, particularly when formed of precious conductive metals. Electrically conductive materials such as gold, copper and silver can present an attractive jewelry appearance. The structure may be ornamented including adding gems. Aluminum as well as various conductive alloys can be used. The structure may be a base metal with a plated second metal, with either or both being conductive. Further, plastic with conductive surfaces at finger engaging portion 12 and add stylus pad 16 can be provided connected by an embedded conductive line. Combinations of materials including portions made of plastic and portions made of metal can also provide interesting combinations as to appearance and function. Even formed partially of plastic, the stylus may be ornamental and may look like jewelry.

FIG. 6 through 10 present features of a fingernail stylus 30 of a (second) embodiment according to the invention. The fingernail stylus 30 also presents the appearance of jewelry. Stylus 30 is based on a finger engaging portion 32 which is a spiral wrap structure. Although the initial or rest shape is predetermined and is intended to provide a spiral wrap with a taper following the shape of the fingertip 24 of the finger 23. The structure allows for size adjustment. Particularly, the structure allows for changes in length of the fingernail and variations in the size of fingertip 24.

The fingernail stylus 30 includes a fingernail engaging part 40. The fingernail engaging part 40 is preferably structured to engage the tip edge 27 of the fingernail 25. The engaging part 40 advantageously provides the structure to receive the tip edge 27 to set the position of the connected stylus pad 34 relative to the fingernail 25. Based on the spiral wrap of the finger engaging portion 32, which spiral extends into a connecting portion 38, the structure of the fingernail stylus 30 allows for the nail to be a various different lengths (between a minimum distance from the fingertip 24 to some maximum distance). Further, the spiral wrap is effective for maintaining the fingernail stylus 30 in position relative to the finger.

Figure 22A:
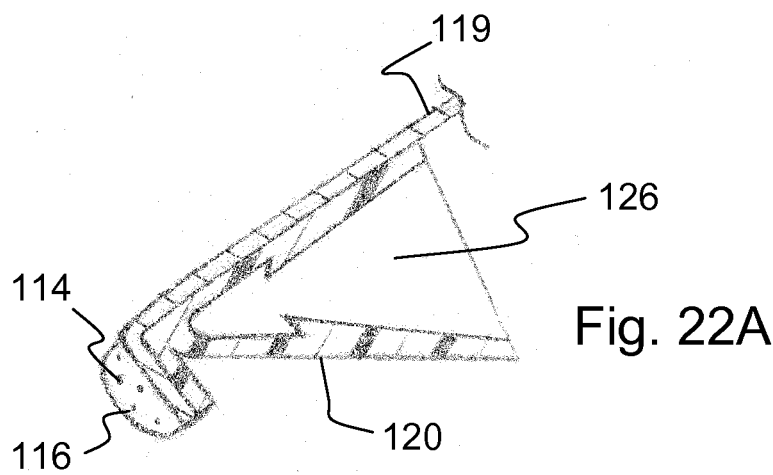
FIG. 22A is a sectional view of a fingernail engaging portion with connected stylus pad according to the sixth embodiment and other embodiments of the invention.
Figure 22B:
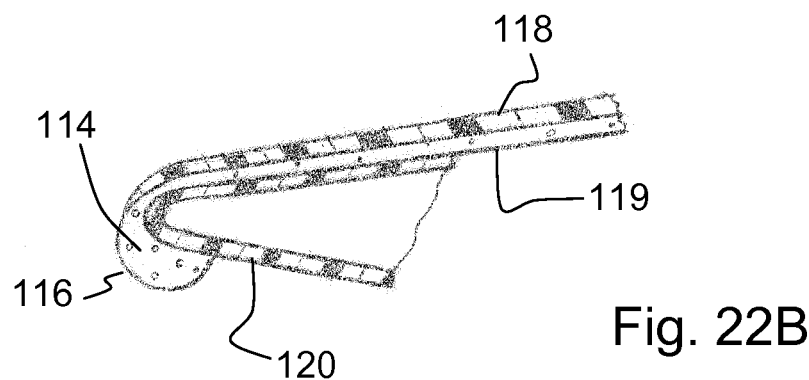
FIG. 22B is a sectional view of a fingernail engaging portion with connected stylus pad wherein the stylus pad and the connecting conductive material (or carrier-wicking material caring conductive liquid) is an integral layer.

As shown in FIG. 9, the fingernail engaging portion 40 can be provided by walls 48 which provide a gradual widening of a fingernail receiving space 46. If the stylus 30 is mostly made of metal, the walls 48 may be lined with a plastic material (see FIG. 22A). The wall structure is connected to a portion to form a support plane 42 of the stylus pad 36. This plane 42 is at some angle relative to a fingernail insertion direction 44. In FIG. 9, the pad 34 is shown with a surface 36 perpendicular to the nail insertion direction 44 ($\theta$ equal 90°). In FIG. 6, the angle is shown to be near 45°. It is also possible to connect the stylus pad to the fingernail engaging portion 40 and/or the connecting portion 38 to allow a variation of the angle between the contact pad surface and the nail insertion direction 44. This variation of angle $\theta$ allows adjustment to the optimal contact position. This may be by a flexible connection between pad 34 and the fingernail engaging portion 40 and/or the connecting portion 38. This can also be a pivot connection with a friction lock for angle setting. An advantageous construction includes a foam structure forming the contact surface 36. The surface is resilient and may even be curved, as the material flattens to the touchscreen surface (FIG. 22B). This conductive foam forming contact surface 36 is mounted at one of several angular positions relative the pad 34 and the fingernail engaging portion 40 and the connecting portion 38. The set angular position of the foam structure forming the contact surface 36 (after being adjusted into a seated angular position) provides further variation in contact angle based on the foam contact surface 36 being resilient and following the angle of the touch pad surface (see FIG. 22C). This same effect is provided by a porous or fibrous structure forming the contact surface 36. The porous or fibrous structure 36 is wetted with conductive fluid (water) or a conductive gel, providing electrical contact back to the finger. Although water as the conductive material has advantages, such as being simple to replenish, additives may be provided such that the liquid or gel evaporates more slowly. A liquid gel slurry may also be used. The porous or fibrous structure 36 is resilient and the liquid or gel provides exceptional actuation of the touch screen, allowing a smaller overall stylus pad surface dimension. With all embodiments, the contact surface of the stylus pad may be foam, fiber, porous or other conductive material (including a carrier material holding conductive liquid or gel) that allows variation in contact angle based on the contact surface being resilient and following the angle of the touch pad surface. Further, if the stylus 30 is mostly made of plastic (as with the other embodiments), the plastic structure may support conductive structures including conductive foam and porous or fibrous material carrying conductive liquid and/or gel.

FIG. 10 shows a cross-sectional view of the nail engaging portion 40 with the nail receiving space 46. FIG. 10 also shows the stylus pad 34. The stylus pad 34 may be circular or even square or rectangular. It advantageously is sized to the big enough to provide good contact at the generally planner contact surface 36, with the touchscreen. It has been found that a size of about 1 mm by 1 mm and even smaller footprints function well with a resilient surface material as part of the conductive stylus pad. Particularly a pad contact surface that adapts to the angle of the tough screen surface allows for a smaller stylus pad surface area. Although foam and material carrying conductive fluid or gel can be applied to an otherwise metal and/or plastic fingernail stylus, the planner contact surface 36 may, as with all embodiments according to the invention, be provided with surface attributes to make better actuation with the touchscreen. For example, a conductive fabric such as a woven or nonwoven conductive fabric may be provided at the surface 36 with a metal or plastic backing. Further, conductive foam and conductive materials with attributes that somewhat adapt to the surface angle of the touch screen are preferred.

FIGS. 11 through 13 show a fingernail stylus generally designated 50 according to a third embodiment of the invention. Stylus 50 is preferably made of a metal which is somewhat bendable to provide a good fit on the finger 23 of the user. A finger engaging portion 52 is provided which is generally C-shaped, namely the structure presents a gap or an overlap region between or at one portion 62 and an opposite portion 62. The portions 62 contact the fingertip 24 of the user and may be pressed or be slightly bent to provide good electrical contact and good holding contact relative to the finger 23. The stylus 50 includes a connecting portion 58 which is preferably an integral metallic strip extending from the finger engaging portion 52. The connecting portion 58 is connected to the stylus 54, with surface 56, and to a fingernail engaging portion 60. The fingernail engaging portion 60 is similar or identical to the fingernail engaging portion 40 described above (or alternatively as shown in FIG. 22A, 22B or 22C). As with the other embodiments, surface 56 may be at any desirable angle relative to the fingernail tip 27 or a feature for adjusting the angle may be provided. According to the embodiment of FIGS. 11 through 13, variations in the length of the nail 23 of the user are allowed with this resulting in some movement of the position that engaging portion 52 engages the finger 23 of the user. The distance d, between the location of application of the engaging portion 52 and the finger joint 28 varies somewhat depending on the length of the nail 23. However, the slight bendability of the metal allows for good electrical and physical contact with the finger 23. Further, the connecting portion 58 may be structured to have two rest bent states, namely a state in which it is slightly bowed as shown in FIG. 11 and a state in which is slightly bowed in a direction opposite to that shown in FIG. 11. This provides a slight spring pressure and allows for less chances of the stylus 50 slipping off the finger 23 of the user.

Figure 14:
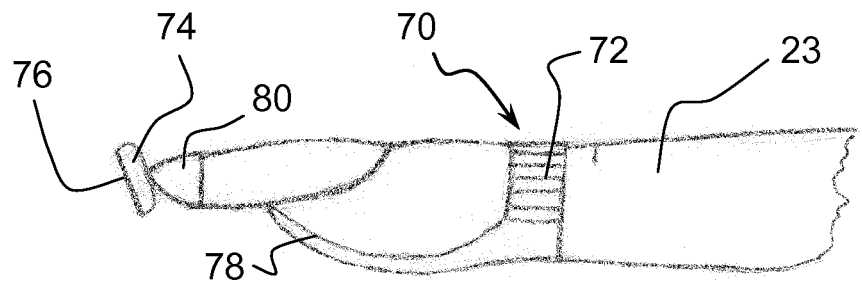
FIG. 14 is a side view of a fourth embodiment of a fingernail stylus according to the invention.
Figure 15:
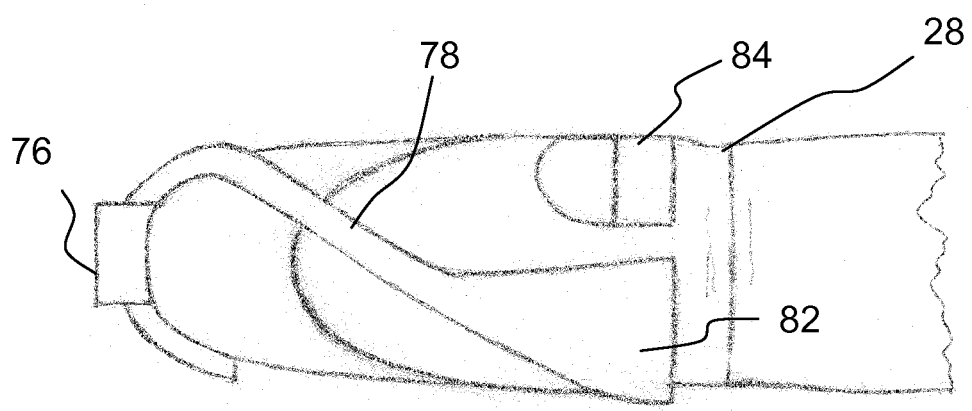
FIG. 15 is a bottom view of the fourth embodiment of a fingernail stylus according to the invention.
Figure 16:
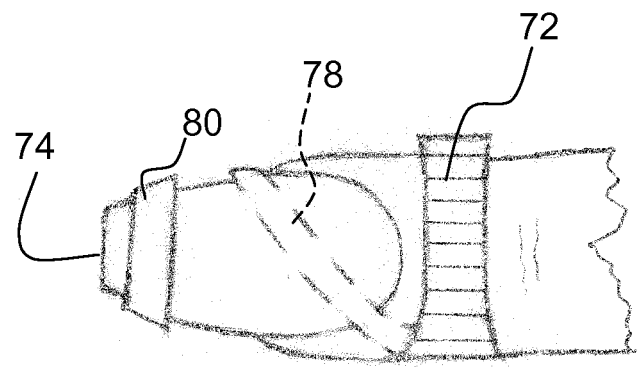
FIG. 16 is a top view of the fourth embodiment of a fingernail stylus according to the invention.

FIGS. 14 through 16 show a fingernail stylus generally designated 70 according to a fourth embodiment. The stylus 70 may be formed of metal that is flexible and can form fit to the finger 23, preferably in a region between the bottom of the nail 25 and the first joint 28. A conductive metal, or conductive metal alloy may be used, with good flexure attributes. A bendable plastic may also be used in combination with conductive material and even a conducting plastic or conducting foam may be used. A finger engaging portion 72 has a generally C-shape with portions 84 which form a gap allowing pressing and bending to make good electrical contact with the finger 23/fingertip 24 and provide a good fit. Each of the portions 82 may be pressed and the connecting portion 78 may also be bent and be pressed against the fingertip surface 24. The connecting portion 78 extends to the stylus 74 with a stylus surface 76 and also may flex to allow for good fit and retention of the stylus 70 on the finger 23. A fingernail engaging portion 80 is also connected to the connecting portion 78. The fingernail engaging portion 80 is similar to or identical to the fingernail engaging portion 40 described above. It may also have a very simple and lightweight design as described below with reference to FIGS. 22A, 22B and 22C. The stylus pad surface 76 may be at any desirable angle (or may have an adjustable angle) relative to the fingernail tip 27, which is engaged in the fingernail engaging portion 80. The stylus pad surface 76 may be formed of the same conductive metal as the remainder of the fingernail stylus 70, if it is formed as an integral metal structure. However, the stylus 70 may be formed of combinations of materials including plastic with a conductive path extending along connection portion 78 to material at the stylus pad surface 76. This material may be conductive foam, such as the conductive foam described above. The stylus pad as well as the other conductive features (transmission path and finger electrical engagement) may be a porous or fibrous structure that takes up a conductive liquid or gel. A wicking structure (that spreads water or other conductive fluid by capillary action) may form a wick electrical charge system comprising the stylus pad surface defining structure, the electrical charge conductive path and the finger electrical contact structure.

According to the embodiment of FIGS. 14 through 16, variations in the length of the nail 23 of the user are accommodated by changing the position of finger engaging portion 52 relative to the base of the fingernail 25. With this embodiment, the entire distance range of between the bottom of the fingernail and the first joint 28 can be used with the resilient nature of the portions 84 and connection portion 78 allowing variations in positioning.

Figure 17:
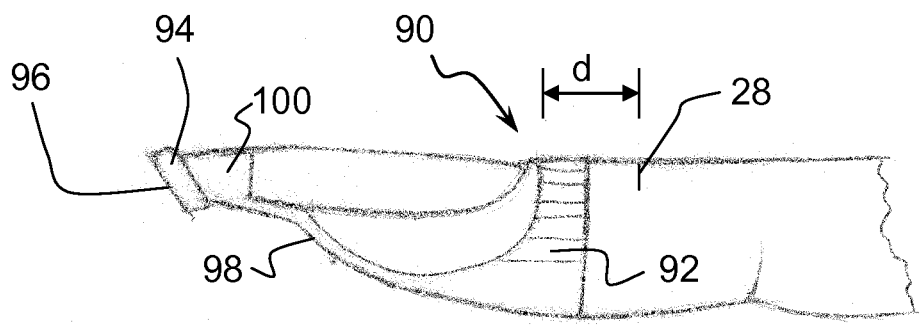
FIG. 17 is a side view of a fifth embodiment of a fingernail stylus according to the invention.
Figure 18:
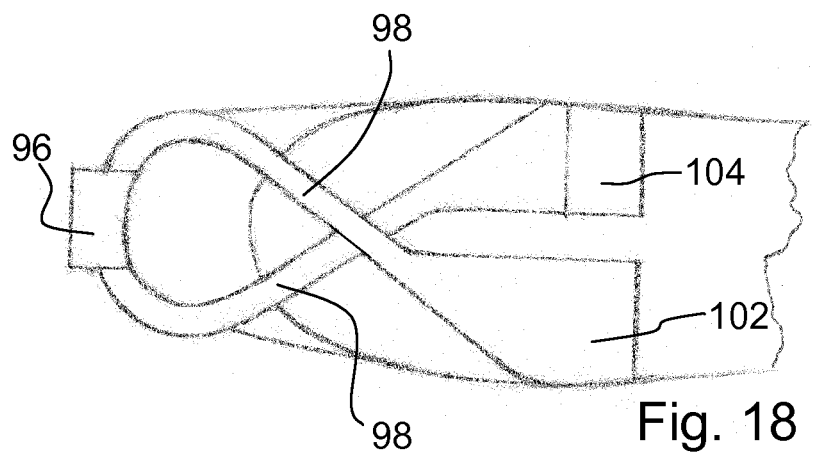
FIG. 18 is a bottom view of the fifth embodiment of a fingernail stylus according to the invention.
Figure 19:
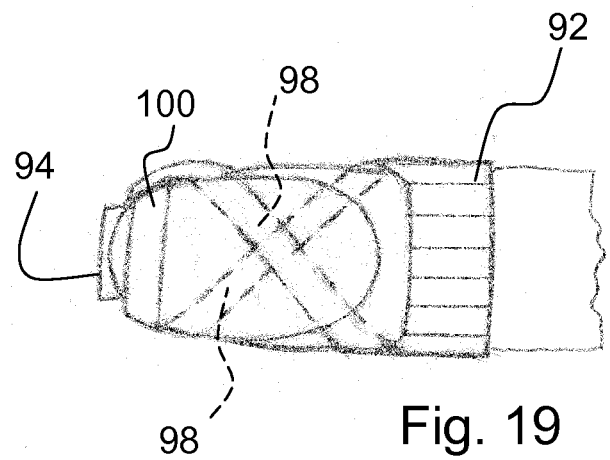
FIG. 19 is a top view of the fifth embodiment of a fingernail stylus according to the invention.

The embodiment of FIGS. 17 through 19 is similar to the embodiment of FIGS. 14-16 but is based on a fingernail stylus 90 with two connecting portions 98, each connecting between a finger engaging portion 92 and the stylus pad 94, with surface 96, and the fingernail engaging portion 100. The fingernail engaging portion 100 is similar to the fingernail engaging portion 40 or the fingernail engaging portion described with reference to FIG. 22A, 22B or 22C (the latter alternatives being particularly useful wherein the material of the stylus pad includes plastic or combinations of one or more of plastic, and metal or conductive material layers, wicking material layers or portions, etc.). The finger engaging portion 92 has a C-shape with portions 102-104 providing a gap and allowing tightening based on the resiliency of the material as well as the resilient nature of the two connecting portions 98.

Figure 20:
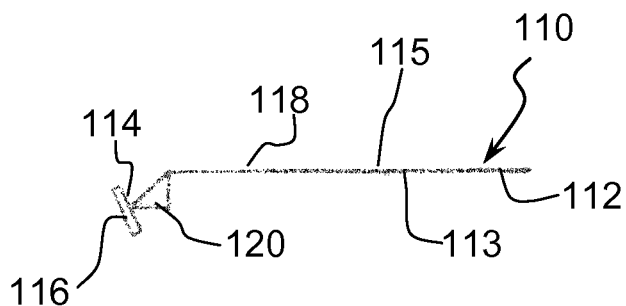
FIG. 20 is a schematic side view of a sixth embodiment of a fingernail stylus according to the invention.
Figure 21:
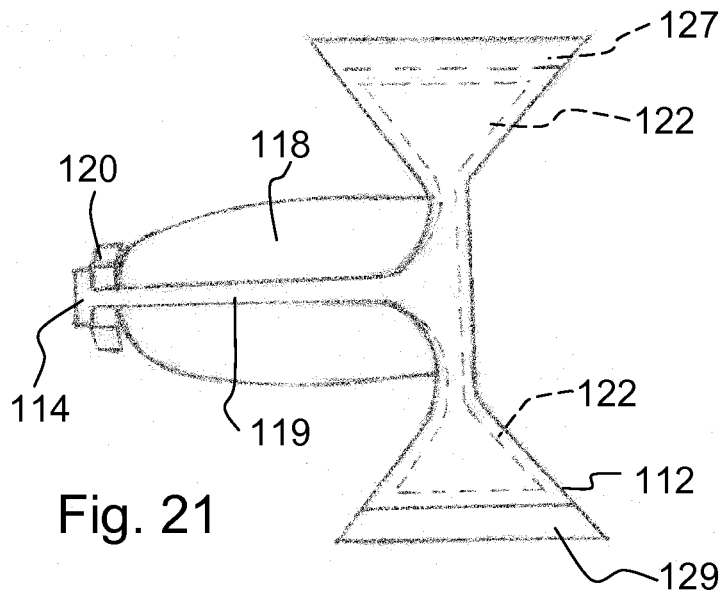
FIG. 21 is a top view of the sixth embodiment of a fingernail stylus according to the invention.

FIG. 20 is a schematic side view of embodiment according to the invention in which most of the structure is initially planar, prior to application to the fingernail around fingertip surface 24 and along the fingernail 25 of the user. As can be seen in FIG. 20, a fingernail stylus 110 is provided with the finger engaging portion 112 having an upper surface 115 and lower surface 113. This material of this finger engaging portion 112 extends into a connecting portion 118 to a fingernail engaging portion 120 and stylus 114 with stylus surface 116. As can be seen in FIG. 21 the fingernail engaging portion 112 extends outwardly in a somewhat bowtie shape to edges with first fastener portion 127 and second fastener portion 129. The first fastener portion 127 and second fastener portion 129 may be a hook and loop fastener (VELCRO) or an adhesive. Instead of connecting to each other or in addition, the sides of the fingernail engaging portion 112 may have an adhesive to stick directly to the finger, in the manner of a band-aid. As can be seen by the dashed lines in FIG. 21, the side 113 of the finger engaging portion 112 has conductive material regions 122. This is preferably embodied as a conductive material layer applied on a plastic layer which otherwise forms the finger engaging portion 112 and connecting portion 118. The conductive material extends at 119 along connecting portion 118 (and it may extend through the main layer of plastic material from one side 113 to the other side 115) to the stylus surface 116 (see FIGS. 22A and 22B). The connecting portion 118 may be just slightly wider than the transmission path formed by the conductive material 119, or may be as shown, almost as wide as the fingernail 25 on which it is applied. The connecting portion 118 may have an adhesive to stick to the nail surface. The stylus surface 116 of a stylus pad 114 is connected to fingernail engaging portion 120. As can be seen in FIG. 22A the fingernail engaging portion 120 includes a fingernail receiving region 126. In this embodiment the fingernail engaging portion 120 is made of plastic and may have retaining elements 121 which can grip the upper and lower surfaces of the fingernail 25, to slightly resist removal of the fingernail 25 from the fingernail receiving region 126. The fingernail engaging portion 120 extends inwardly into the stylus pad 114 with flattened surface. The stylus pad surface itself is conductive and connected to conductive material 119. The conductive material 119 may be a conductive foam line (or conductive liquid carrier-porous or fibrous wicking material) leading to conductive foam (or conductive liquid carrier-porous or fibrous wicking material) forming the stylus pad portion 114 as shown in FIG. 22B. Advantageously the conductive material 119 and the stylus pad 114 are part of an integral layer of material. According to the fingernail engaging portion of the variation of FIG. 22B the stylus pad 114 and the connecting conductive material (or carrier-wicking material caring conductive liquid) is an integral layer. The connecting portion 118 is also an integral layer which forms the finger engaging part 112 and may have adhesive on one side to stick to the fingernail and to the finger. In this embodiment the finger engaging portion 120 includes a power has stick insert similar to FIG. 22A. However, the material forming the two layers (layer with foam or wicking material providing stylus 114 and conductive material 119 and layer forming connecting portion 118 and finger engaging portion 112) may also form a pocket (who the embodiment of FIGS. 26-27 and FIGS. 32-35 were by the fingernail stylus is extremely simple and easy to manufacture. However, plastic insert provides advantages with regard to engaging the fingernail.

Figure 22C:
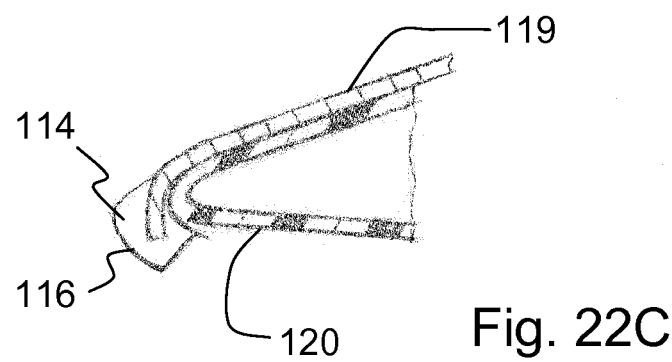
FIG. 22C is a sectional view of a fingernail engaging portion with connected stylus pad having fixed or angle adjustably seated foam forming the stylus pad contact surface according to a variation of the sixth embodiment and other embodiments of the invention.

According to FIG. 22C, the structure is similar to that of FIG. 22A, except the foam material forming the stylus pad 114 is mounted on a resilient portion of conductive material 119 so the stylus pad 114 may be moved somewhat to adjust the angle of the stylus pad surface 116. Other structure to allow pivoting or repositioning of the stylus pad 114 (to change the angle of the surface 116) may be provided, including pivoting parts of fingernail engaging portion 120 that allow pivoting of the stylus pad and electrical continuity.

According to an advantageous variant of the embodiments of FIG. 20-22C, the conductive material regions 122, the conductive material 119 and the stylus surface 116 are formed of a porous or fibrous material that can hold a liquid or gel that is conductive. With water as the conductor, a wicking system is formed, particularly with conductive material 119, conductive material regions 122 and stylus surface 116 being a continuous or integral structure. A similar embodiment is shown in FIGS. 33-35. The fingernail stylus 110 with conductive material 119, conductive material regions 122 and stylus surface 116 impregnated with water may be sealed, waiting for use. If the finger and nail facing surfaces of portion 118 and portion 112 have an adhesive in the nonconductive regions, these adhesive surfaces may be covered with a removable film/backing that also covers the wetted conductive regions. The fingernail stylus 110 is stored like a band-aid, the film/backing is removed and the nail is inserted into the nail receiving region 126 and the portion 118 and portions 112 that have an adhesive are applied to the fingernail 25 and finger 23 just below the nail 25. If the wicking system dries out, it may be rewetted in a simple manner via the surface 116.

Figure 23:
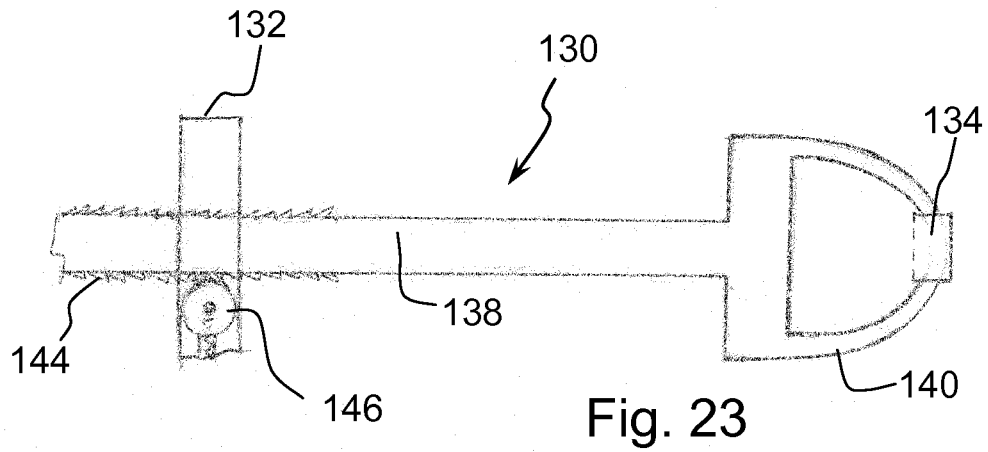
FIG. 23 is a top view showing a seventh embodiment of a fingernail stylus according to the invention.

FIG. 23 is a schematic view showing an embodiment of the invention with a fingernail stylus generally designated 130. The fingernail stylus 130 includes a fingernail engaging portion 140 that supports a stylus pad 134. This may be similar to the structure shown in FIG. 22A, 22B or 22C. Further, the fingernail engaging part 140 extends along the fingernail to a connecting portion 138 which extends back toward a fingernail engaging portion 132 in the form of a ring. According to a simple design the structure is made of plastic or metal or combinations thereof with the connecting portion 138 having conductive material extending from the fingernail stylus 134 (and a contact surface made for example conductive foam) to an adjustable connection designated 146. The adjustable connection may be for example a spring loaded ball which bears against the jagged surface 144 to hold the two parts in relative position. This allows variations of the length of the nail and changes in the distance from the fingernail engaging portion 144 to the location of the ring 132 on the finger of the user. The electrical contact may be through another spring loaded contact (for example spring contacts disposed on the ring 132) or may be provided by the electrical contact at jagged surface 144 through the spring loaded ball and structure of the ring 132.

Figure 24:
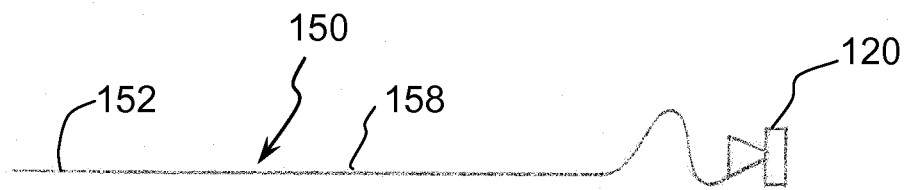
FIG. 24 is a schematic view of an eighth embodiment of a fingernail stylus according to the invention.

FIG. 24 shows another embodiment of the invention with a fingernail stylus generally designated 150. The fingernail stylus 150 includes a fingernail engaging portion 120 which is as shown in FIG. 22A, 22B or 22C. The conductive line 119 extends as the connecting portion 158 to finger engaging portion 152. Preferably in a region adjacent to the fingernail engaging portion 120, the connecting portion 158 has a pre-shaped spiral form (less flexible but resilient), which can be bent slightly but allows easy engagement at the fingertip and fingernail to set a position allowing the connecting portion 158 and fingernail engaging portion 152 to be wrapped around the finger 23 of the user. In a wrapped state of portion 152, this embodiment looks somewhat like the embodiment according to FIG. 6 through 10. The material of finger engaging portion 152 and connecting portion 158 is more flexible and allows a full unwrapping and wrapping for successive uses.

Figure 25:
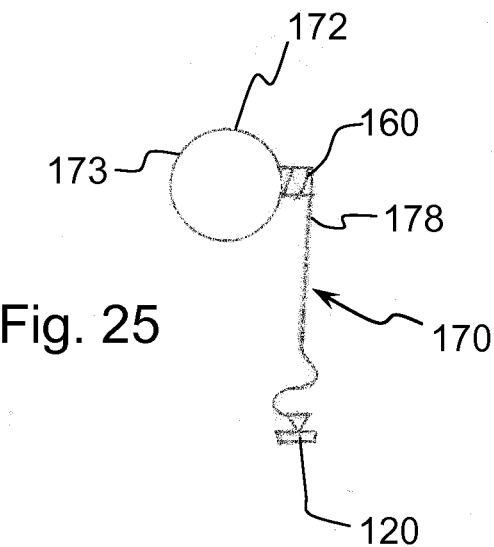
FIG. 25 is a schematic view of a ninth embodiment of a fingernail stylus according to the invention.

The embodiment according to FIG. 25 provides a fingernail stylus generally designated 170 including a fingernail engaging portion 120 which is as described above. Further, a connecting portion 178 is provided which can be welded on or otherwise made integral with a post 160 of a ring 173. The post 160 provides an electrical connection between the conductive material of the connecting portion 178 and conductive material 173. The conductive material line of connecting portion 178 leads to the conductive surface of the stylus pad associated with fingernail engaging portion 120. The user engages the fingernail in the fingernail engaging portion 120 and determines a desirable length to position the ring 173 with the change of length being allowed by wrapping or unwrapping the connecting portion 178 from post 160.

Figure 26:
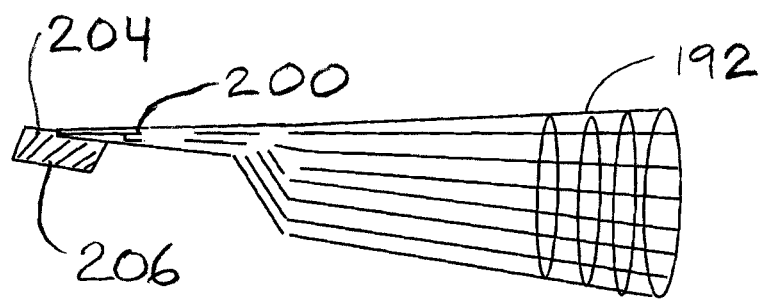
FIG. 26 is a schematic view of a tenth embodiment of a fingernail stylus according to the invention.
Figure 27:
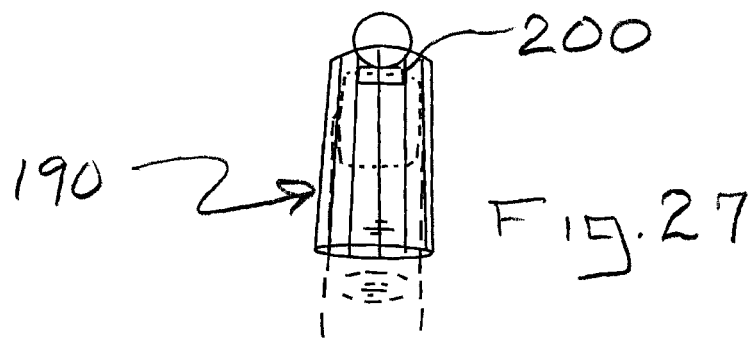
FIG. 27 is a schematic top view of the tenth embodiment of a fingernail stylus.
Figure 30:
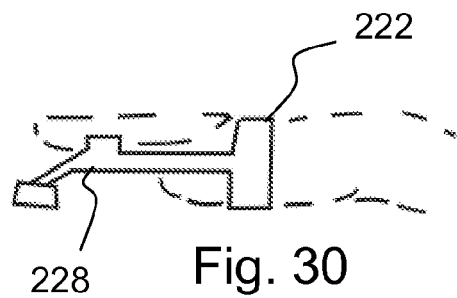
FIG. 30 is a side (outside) view of the fingernail stylus of FIG. 28.
Figure 31:
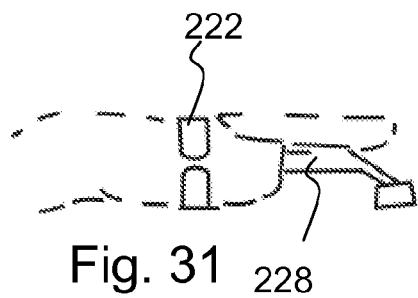
FIG. 31 is a side (inside) view of the fingernail stylus of FIG. 28.
Figure 29:
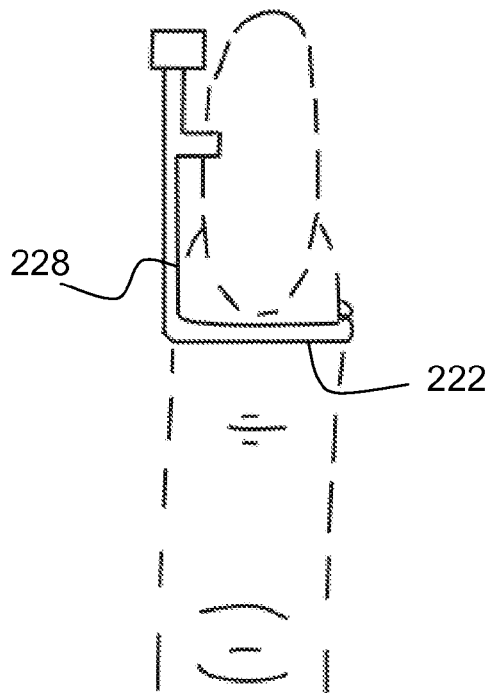
FIG. 29 is a top view of the fingernail stylus of FIG. 28.
Figure 28:
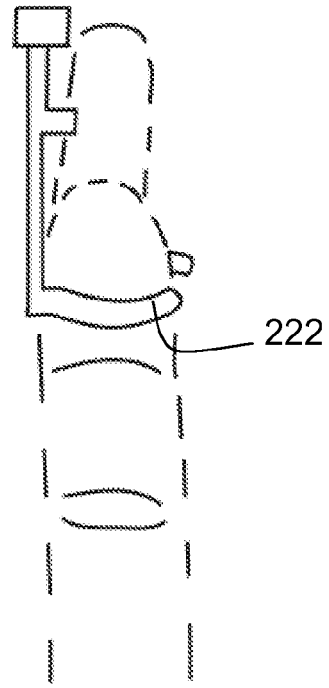
FIG. 28 is a bottom view of a fingers nails stylus which is a variation of the embodiment of FIGS. 2-5.

FIG. 26 shows a further embodiment of the invention providing a fingernail stylus generally designated 190. The stylus 190 is essentially a sock type structure with elastic features to allow for good engagement between the finger 23 of the user and the material of the finger engaging portion 192. The stylus 190 may be rolled up and then applied in the manner of a condom. The stylus 190 may be made completely of conductive foam or similar conductive material. Combinations of materials provide the elastic nature and conductive nature may be used to keep the structure 190 on the fingertip surface 23 or generally on finger 23 and to provide the electrical charge of the finger 23 of the user at a surface of stylus pad 194 with adjacent fingernail engaging portion 200. Conductive foam is particularly advantageous, at locations with combinations of conductive foam and other materials being useful. Openings may be provided in locations for better breath ability. Further, the use of some plastic at the fingernail engaging portion 200 allows for a soft engagement of the fingernail and a good feel for the user. This may be as shown in FIGS. 22A, 22B and 22C. The stylus pad 204 and surface 206 may be provided as conductive foam. Portions of the stylus 190 may also be part of a wicking system as described.

FIGS. 28 through 31 show a fingernail stylus 220 that is similar to the embodiment of FIGS. 2-5, except the finger engaging structure 222 is c-shaped (instead of spiral shape), with adjustable gap to the side of the finger 23 and connecting portion 228 is straight and extends along the side opposite the gap.

FIGS. 33-35 show a fingernail stylus generally designated 240 that is similar to the embodiment of FIGS. 21-22C in which the conductive material is a material carrying a conductive liquid or gel. The structure of stylus 240 is formed with a flat backing sheet 230 and a porous or fibrous layer 232. A portion of the porous or fibrous layer (wicking material layer) has a bulged region to form the stylus pad 246 with this passing though an opening 233 of the flat backing sheet 230. The material of stylus pad 246 and fibrous layer 232 provides a carrier for conductive fluid such as water (or water with an agent to slow evaporation) or a gel or a mixture (liquid gel slurry). The material of stylus pad 246 and fibrous layer 232 may be an integral structure or at least in contact, to provide a wicking action. Instead of the layer 232 and pad 246 being a carrier for conductive liquid and/or gel, these materials may instead be conductive foam or conductive plastic or metal layer. The shaped layers are folded with the backing sheet 230 forming the outside, except where the bulged region stylus pad 246 extends through the opening 233. This fold forms a pocket 235 (fingernail receiving portion) that can receive the fingernail 25. This can be seen in the cross sectional view (FIG. 35). An insert may also be provided for engaging the fingernail as shown in FIG. 22A. Further, the conductive material, such as material carrying a conductive liquid or gel, may extend below the fingernail from the structure engaging the fingernail to the finger tip region.

Figure 44:
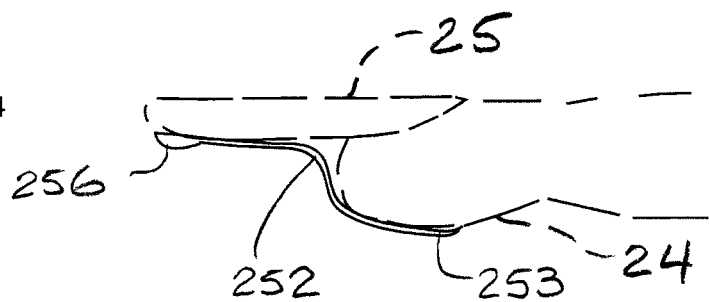
FIG. 44 is a side view of another embodiment of a fingernail stylus according to the invention, showing the fingernail stylus relative to a finger.
Figure 45:
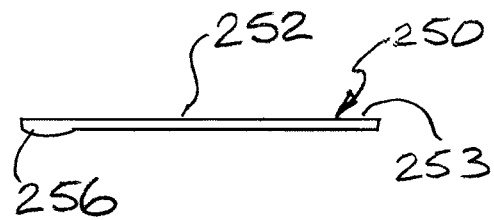
FIG. 45 is a side view of the fingernail stylus of FIG. 44.
Figure 46:
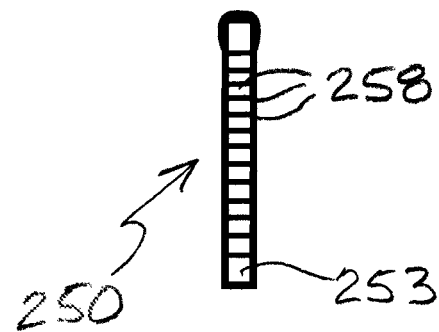
FIG. 46 is a top view of the fingernail stylus of FIG. 44.

In FIGS. 44, 45 and 46 an embodiment of a stylus 250 is shown in which the stylus pad 256, and electrical connection to the fingertip designated 253, is provided via a continuous carrier material 252. The material of stylus pad 256 and fibrous layer 252 may be an integral structure or at least in contact with each other, to provide a wicking action. The layer 252 and pad 256 may be a carrier for conductive liquid and/or gel and these materials may instead also be conductive foam or conductive plastic or metal layer or a metal composite. Adhesive strips 258 are provided to connect the carrier material to the underside of the fingernail 25 and to the fingertip surface 24.

Figure 36:
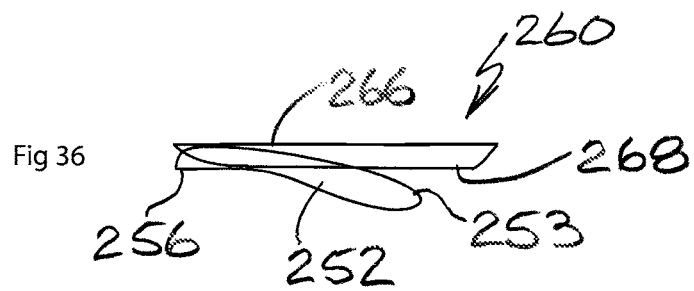
FIG. 36 is a side view of a another embodiment of a fingernail stylus according to the invention.
Figure 37:
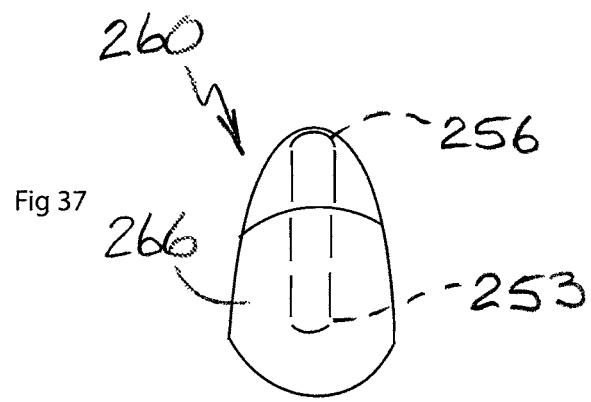
FIG. 37 is a top view of the fingernail stylus of FIG. 36.

FIGS. 36 and 37 shows the stylus 260 in the form of a press on nail element 266 with lower surface having adhesive 268. This allows the press on nail element 266 to be applied to the top of the fingernail 25 with the adhesive 268 temporarily bonding the press on element 266 to the fingernail 25. Also connected to the lower surface of element 266 is a continuous carrier material 252 such as described with reference to stylus 250, which includes a stylus pad 256 and an electrical connection to the fingertip designated 253. With the element 266 applied to the fingernail 25 the stylist pad 256 is positioned just below the end of the press on element 266 and the connection region 253 is in contact with the fingertip surface 24.

Figure 38:
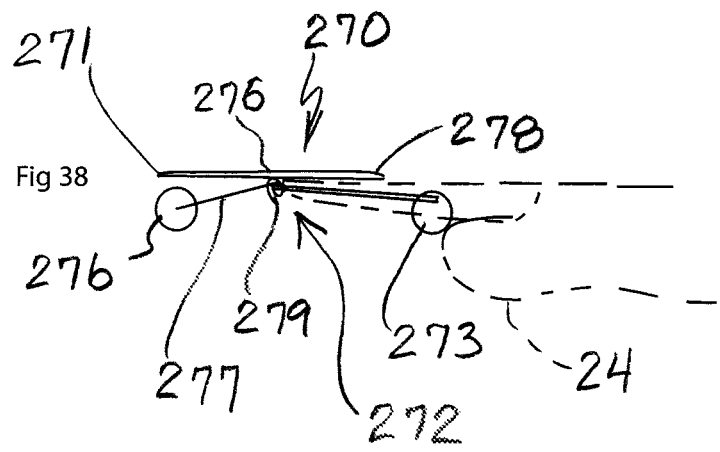
FIG. 38 is a side view of a another embodiment of a fingernail stylus according to the invention.
Figure 39:
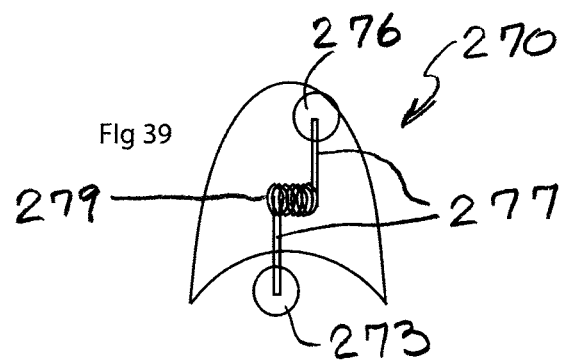
FIG. 39 is a bottom view of the fingernail stylus of FIG. 38.
Figure 40:
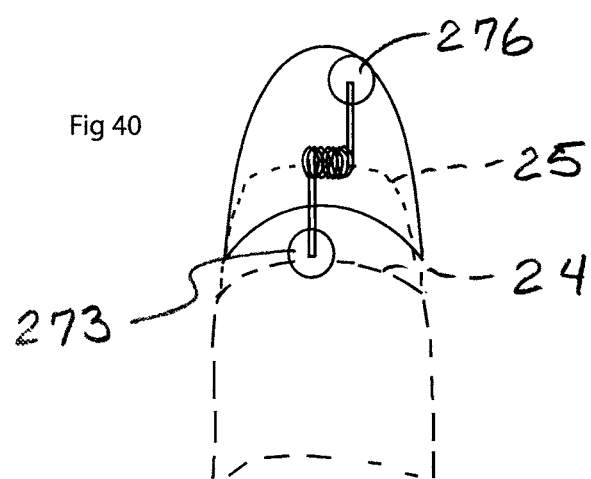
FIG. 40 is a bottom view of the fingernail stylus of FIG. 38 showing the fingernail stylus relative to a finger.

FIGS. 38, 39 and 40 shows the stylus 270 in the form of a nail element 276 that forms part of a clamping structure 272. The clamping structure 272 is formed with conductive path structure 277 being an underside of the clamp which exerts a clamping force in opposition to rear portion 278 forming the upper side of the clamp. The clamp is opened by pressing the stylist pad 276 toward the tip 271 allowing the fingernail 25 to be removed from the clamping action between structure 277 and rear portion 278. The conductive path structure 277 between the stylus pad 276 and fingertip engaging structure 273, is formed of relatively stiff metal. However, a relatively ridged plastic structure carrying gel, wicking/carrier as well as conductive plastics and metal composite materials may also be used. The engaging structure 273 and the stylus pad 276 are made of foam or other elastic or deformable material. A spring 279 applies a force urging the rear portion of path structure 277 toward rear portion 278. With this force the fingernail 25 is clamped between rear portion 278 and the rear portion of path structure 277 and the structure 273 presses toward the fingertips surface 24.

Figure 41:
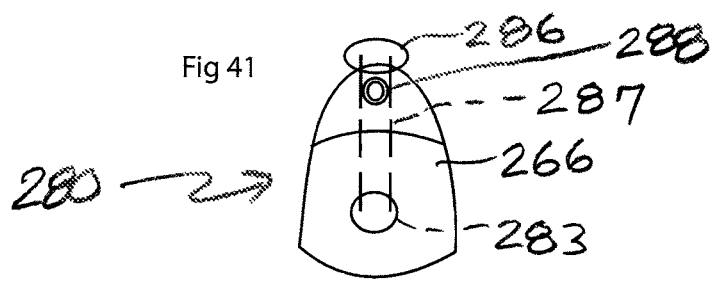
FIG. 41 is a top view of another embodiment of a fingernail stylus according to the invention.
Figure 42:
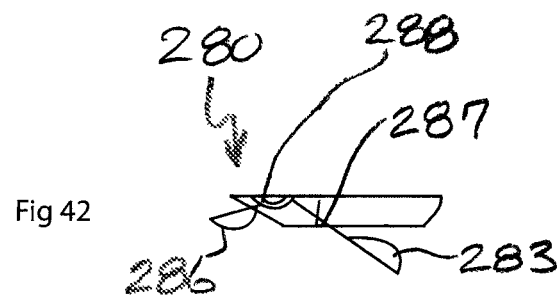
FIG. 42 is a side view of the fingernail stylus of FIG. 41.
Figure 43:
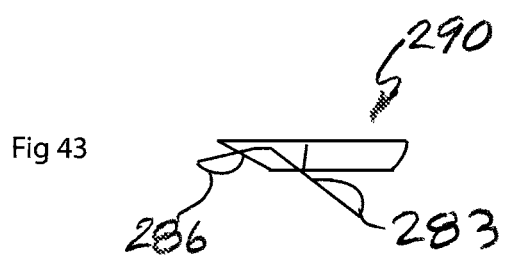
FIG. 43 is a side view of another embodiment of a fingernail stylus according to the invention.

FIGS. 41 through 43 showing embodiment for a fingertip stylus 280 which is similar to the finger tip stylus 260 of FIG. 36. The press on nail part 266 is connected to a conductive element 287 which may be a relatively stiff conductive metal. A stylus pad 286 is at one end of the conductive element 287 and a fingertip engaging part 283 is at the other end. Conductive element 287 and part 283 may be a carrier material with the gel or conductive liquid or may be other conductors such as a conductive foam, fabric, plastic, metal composite or the like. In the embodiment of FIGS. 41 and 42 the metal conductive element 287 is connected to the press on part 266 by a rivet 28. FIG. 43 shows another embodiment for a fingertip stylus 290 which is the same as the fingertip stylus 280 except instead of using the rivet 28 the conductive element 287 is welded or bonded to the lower surface of the press on nail part 266.

While specific embodiments of the invention have been shown and described in detail to illustrate the application of the principles of the invention, it will be understood that the invention may be embodied otherwise without departing from such principles.

What is claimed is:

1. A finger stylus for touch sensitive screen, the stylus comprising:

a finger physical connection to a finger or fingertip of a user;

a finger electrical connection to the electrical charge of the finger or fingertip, the finger electrical connection being connected to the physical connection;

a stylus pad with electrical stylus pad surface, said stylus pad comprising a liquid or gel carrier material impregnated with a conductive liquid and/or gel;

a fingernail positioning means for positioning and supporting the stylus pad relative to a fingernail of the finger or fingertip to define a force transmission path from the fingernail to the stylus pad to direct forces applied by the finger from the fingernail through the fingernail positioning means to the stylus pad;

a bridging physical connection from said fingernail positioning means to said finger physical connection; and an electrical charge transmission path from said electrical stylus pad surface to said finger electrical connection, the electrical charge transmission path being connected to said bridging physical connection, wherein said finger electrical connection and said electrical charge transmission path each comprise a liquid or gel carrier material impregnated with a conductive liquid and/or gel.

2. A finger stylus according to claim 1, wherein said fingernail positioning means positions the stylus pad surface relative to a tip edge or side of the fingernail and/or supports the stylus pad surface against relative movement between the position of the stylus pad and the fingernail.

3. A finger stylus according to claim 1, wherein the surface of the stylus pad comprises a conductive foam.

4. A finger stylus according to claim 1, wherein the surface of the stylus pad comprises a conductive fabric.

5. A finger stylus according to claim 4, wherein the fabric is one of a woven and nonwoven conductive material.

6. A finger stylus according to claim 1, wherein the stylus pad has a width that is greater than a width of the fingernail.

7. A finger stylus according to claim 1, wherein the stylus pad has a substantially planar surface.

8. A finger stylus according to claim 7, wherein the stylus pad surface is flexible to adapt to the angle of a touch sensitive screen.

9. A fingernail stylus comprising:

a finger/fingertip physical connection comprising structure defining a physical connection to the finger/fingertip;

a finger/fingertip electrical connection comprising structure defining an electrical connection to the finger/fingertip, the finger/fingertip electrical connection being connected to the finger/fingertip physical connection;

a stylus pad with a stylus pad surface;

a nail positioning means for positioning and/or supporting said stylus pad relative to the fingernail;

a conductive liquid and/or gel;

a bridging physical connection from the nail positioning means to the finger/fingertip physical connection; and an electrical charge transmission path from the stylus pad to the finger/fingertip electrical connection, the electrical charge transmission path being connected to the bridging physical connection, wherein:

said finger/fingertip electrical connection, said stylus pad with said stylus pad surface and said electrical charge transmission path are each formed of a same material;

said same material defines a liquid or gel carrier holding the conductive liquid and/or gel; and the nail positioning means supports the stylus pad relative to the fingernail and forms a force transmission path from the fingernail to the stylus pad to direct forces applied by the finger from the fingernail through the fingernail support to the stylus pad.

10. A finger stylus according to claim 1, wherein the force transmission path is along a straight line from the fingernail to a contact surface of the stylus pad.

11. A fingernail stylus according to claim 9, wherein the force transmission path is along a straight line from the fingernail to a contact surface of the stylus pad.

* * * * *